(12) United States Patent
Takahashi et al.

(10) Patent No.: US 6,169,775 B1
(45) Date of Patent: Jan. 2, 2001

(54) RADIATION DETECTING APPARATUS

(75) Inventors: Koji Takahashi; Mitsukazu Morita; Masaki Saito, all of Chiba (JP)

(73) Assignee: Seiko Instruments Inc. (JP)

( * ) Notice: Under 35 U.S.C. 154(b), the term of this patent shall be extended for 0 days.

(21) Appl. No.: 09/040,836

(22) Filed: Mar. 18, 1998

(30) Foreign Application Priority Data

Mar. 19, 1997 (JP) .................................................. 9-066821
Mar. 3, 1998 (JP) .................................................. 10-051162

(51) Int. Cl.[7] .................................................. G12C 17/00
(52) U.S. Cl. .................. 376/245; 250/352; 250/370.15; 376/254; 62/51.1
(58) Field of Search .................................. 376/245, 254; 250/352, 370.15; 62/51.1

(56) References Cited

U.S. PATENT DOCUMENTS

| | | | |
|---|---|---|---|
| 3,836,779 | * 9/1974 | Bruno et al. | 250/352 |
| 5,012,102 | * 4/1991 | Gowlett . | |
| 5,177,364 | * 1/1993 | Gowlett et al. | 250/352 |
| 5,811,816 | * 9/1998 | Gallagher et al. | 250/352 |

* cited by examiner

Primary Examiner—Charles T. Jordan
Assistant Examiner—Jack Keith
(74) Attorney, Agent, or Firm—Adams & Wilks

(57) ABSTRACT

A radiation detecting apparatus comprises a container having a vacuum space, a radiation detecting element disposed in the vacuum space for detecting radiation, and a cooling element disposed in the container for cooling the radiation detecting element to a preselected cooling temperature during operation of the radiation detecting apparatus. A physical absorbing material is disposed in the container for absorbing gases from the vacuum space. A chemical absorbing material capable of activation by heat is disposed in the container for absorbing gases from the vacuum space. A heating device is provided for heating the chemical absorbing material. A measurement and control circuit measures a temperature of the radiation detecting element or a degree of vacuum in the vacuum space to determine whether or not the chemical absorbing material should be activated by the heating device.

20 Claims, 15 Drawing Sheets

RADIATION DETECTING APPARATUS

BACKGROUND OF THE INVENTION

The present invention relates to apparatuses and equipment utilizing vacuum thermal insulation and, more particularly, to apparatuses and equipment for detecting radiation. Apparatuses and equipment for detecting radiation are widely used not only in facilities related to nuclear reactors and facilities related to accelerators but also in the fields of medical equipment, analysis equipment, nuclear physics, astrophysics, industrial instrumentation and the like utilizing radiation.

In conventional radiation detecting apparatuses wherein a radiation detecting element must be cooled, vacuum required for vacuum thermal insulation has been maintained by a physical absorbing material. Further, in order to reduce microphonic noises, a cooling rod has included a part formed by binding thin copper wires together (hereinafter referred to as "copper blade").

A description will now be made on a physical absorbing material and a chemical absorbing material in the context of the present invention. Rare gases and stable gaseous molecules forming closed shell systems are absorbed by the surface of a solid due to the van der Waal's force. Such absorption is referred to as "physical absorption". When atoms other than rare gases approach a surface, a chemical bonding force acts between the atoms and the surface to cause absorption. Such absorption is referred to as "chemical absorption". The physical absorption and chemical absorption normally coexist depending on the type of the solid, the nature of the surface or the types and state of the gaseous molecules. For example, a porous chemical absorbing material can physically absorb a rare gas on its surface by the van der Waal's force, although only a very small amount. Further, even a physical absorbing material sometimes absorbs chemically active gaseous molecules by a chemical bonding force when they approach the surface thereof. A physical absorbing material in the context of the invention is an absorbing material which is intended mainly for physical absorption rather than chemical absorption, which is capable of absorbing various types of gas in a great amount because it is to serve the purpose of performing evacuation by absorbing various types of gases such as water, nitrogen, oxygen, $CO_2$, CO, oxides, nitrides, carbides and carbon hydrides that deteriorate vacuum (hereinafter referred to as "absorption evacuation"), which exhibits an increased absorbing speed as a whole when cooled although the speed depends on the types and states of gases, and which discharges the gases it has absorbed as the temperature rises, although there is hysteresis. For example, activated carbon or molecular sieves or zeolite or silica gel or alumina or a mixture including at least one of those types of materials. A chemical absorbing material in the context of the invention is an absorbing material which is intended mainly for chemical absorption rather than physical absorption, which is capable of absorbing various types of gases in a great amount because it is to serve the purpose of evacuating various types of gases which deteriorate vacuum, and which exhibits an increased absorbing speed as a whole when warmed although the speed depends on the types and states of gases. For example, Ti or Zr or Mo or Ta or Nb or V or Al or Mg or Ba or Ca or Sr or Hf or Cr or W or Fe or Re or Ni or Co or Rh or Pd or Pt or Ir or Mn or Cu or K or an alloy including at least one of these types of metals.

Next, a vibration damping material according to the invention will be described. Synthetic resin, synthetic rubber, a porous substance, a special alloy or the like is used as the vibration damping material. Further, vibration damping materials made of special alloys include integral types and multi-layer types. Synthetic resin, synthetic rubber and porous substances have much out gas and low strength. A multi-layer alloy has low weldability and shapability. A radiation detecting apparatus which requires cooling needs to have a vacuum container and components made of materials having less out gas because it employs vacuum thermal insulation. Further, materials having high weldability are preferred. Integral vibration damping alloys have good processability and weldability and have less out gas. Among integral vibration damping alloys, alloys mainly composed of Mn and Cu have a significant effect of vibration damping. Especially, Mn—20Cu—5Ni (atomic percent), Mn—20Cu—5Ni—2Fe, Mn—20Cu—5Ni—2Fe—2Al, Mn—20Cu—5Ni—2Fe—5Al exhibit quite excellent vibration damping characteristics. A vibration damping material in the context of the invention is an alloy including at least Mn and Cu.

In order to achieve a sufficient effect of vacuum thermal insulation, it is normally required to achieve a degree of vacuum of $10^{-4}$ Torr or less. However, even if the vacuum container is evacuated to high vacuum during the baking of the same, the vacuum is deteriorated beyond the degree of vacuum in a short period of time after the vacuum container is closed due to out gas and the like in the vacuum container. Under such circumstances, according to the prior art, when a radiation detecting element is cooled using liquid nitrogen or a refrigerator, a physical absorbing material is also cooled such that the cooled physical absorbing material achieves absorption evacuation below the degree of vacuum to cool the radiation detecting element under sufficient vacuum thermal insulation even if the degree of vacuum in the vacuum container has been deteriorated beyond the degree of vacuum. For example, a conventional radiation detecting apparatus will be described with reference to the drawings. FIG. 5 shows a radiation detecting apparatus of a type which employs cooling by liquid nitrogen. Vacuum in a cryostat and a radiation detector capsule is separated at a septum 1 to allow each of them to be easily removed. FIG. 6 shows the use of a refrigerator to separate vacuum in the cryostat and the radiation detector capsule at the septum 1. FIG. 7 shows a case wherein a refrigerator is used in the absence of a septum. In the case shown in FIGS. 5 and 6, a chamber into which a physical absorbing material is inserted (hereinafter referred to as "physical absorbing material chamber 2") is provided in each of the separated sections in thermal contact with a region to be cooled. In the case shown in FIG. 7, the cryostat and a radiation detecting element cup share common vacuum, and a physical absorbing material chamber 2 is provided in thermal contact with the region to be cooled. In either case, O-ring 3 made of synthetic rubber such as Viton was used as a vacuum seal, and the surface roughness of major parts in the vacuum container was 0.7 $\mu$mRa.

In the case of cooling using liquid nitrogen shown in FIG. 5, bubbles 29 of nitrogen are generated at the cryostat, and vibration occurs when they leave the cryostat. The vibration causes noises when propagated to the radiation detecting element and a fast FET amplifier 31 to deteriorate energy resolution. For this reason, a cooling rod 8 has conventionally included a part formed by binding thin lead wires (hereinafter referred to as "copper blade 30"). Further, in the case wherein a refrigerator is used as shown in FIGS. 6 and 7, vibrations caused by a compressor 27 and cold finger 28 are propagated through the cryostat and the cooling rod 8 to the radiation detecting element and the fast FET amplifier 31 to again cause microphonic noises. In such an electrical cooling system, reduction of microphonic noises is pursued using the copper blade 30 of the cooling rod 8 similarly.

Problems to be Solved by the Invention

However, a physical absorbing material has not been able to provide a sufficient effect of absorption unless cooled to a low temperature and has not been able to cool a radiation detecting element under significant deterioration of vacuum. Further, vibrations caused by the bubbles 29 and refrigerator have been propagated to an outer pipe 32 of the cryostat in addition to the cooling rod 8 to vibrate the radiation detecting element and fast FET amplifier 31, which has caused microphonic noises to deteriorate energy resolution.

Problems associated with cooling will now be described. First, a relationship of thermal energy during cooling will be considered with reference to the equation shown below.

$$q = Q - q1[P\{Gp(Tp), Ps, Gi(t)\}, Tc, Ts] - q2(\epsilon i, Tc, Ts) - q3 \quad \text{Equation 1}$$

q: amount of heat absorbed to cool a region to be cooled such as a cooling rod, a physical absorbing material and a radiation detecting element Q: amount of heat absorbed by liquid nitrogen or a refrigerator q1: amount of heat that flows into the region to be cooled as a result of thermal conduction of gases in vacuum q2: amount of heat that flows into the region to be cooled as a result of thermal radiation q3: other flows of heat into the region to be cooled, Joule heat and the like as a result of thermal conduction of electrical wiring to the radiation detecting element and the like P{GP(Tp), Ps, Gi(t)}: degree of vacuum si: infrared radiation coefficient of a vacuum inner wall and parts in vacuum Gp(Tp): amount of gases absorbed by the physical absorbing material Tp: temperature of the physical absorbing material Tc: temperature of the region to be cooled, Tc=Tp Ps: degree of vacuum when vacuum is sealed Ts: ambient temperature Gi(t): total amount of gases that deteriorate vacuum t: elapsed time after vacuum is sealed Q is a value representing the cooling capability of liquid nitrogen or a refrigerator and is assumed to be substantially constant. q1 is the amount of heat that flows into the region to be cooled as a result of thermal conduction of gases that pass through the O-ring and gases such as out gas from the inner surface of the vacuum container, which depends on the degree of vacuum P{Gp(Tp), Ps, Gi(t)}, the temperature of the regions to be cooled Tc, the ambient temperature Ts and the like. Further q1 decreases as the decree of vacuum P{Gp(Tp), Ps, Gi(t)} increases and increases as the difference between the temperature of the region to be cooled Tc and the ambient temperature TS increases. The degree of vacuum P{Gp(Tp), Ps, Gi(t)} depends on the amount of gases absorbed by the physical absorbing material Gp(Tp), the degree of vacuum when vacuum is sealed Ps, the total amount of gases that deteriorate vacuum Gi(t) and the like. The degree of vacuum P{Gp(Tp), Ps, Gi(t)} is maintained higher, the greater the amount absorbed Gp(Tp), the higher the degree of vacuum when vacuum is sealed Ps, and the smaller the total amount of gases that deteriorate vacuum Gi(t). The amount of gases absorbed by the physical absorbing material Gp(Tp) increases as the temperature of the physical absorbing material Tp decreases. The total amount of gases that deteriorate vacuum Gi(t) increases with the elapsed time t after the vacuum is completely sealed. q2 represents the amount of heat that flows into a region to be cooled as a result of thermal radiation which depends on the infrared radiation coefficient si, the temperature of the region to be cooled Tc, the ambient temperature Ts and the like. Further, q2 decreases with the infrared radiation coefficient si and increases with the difference between the temperature of the region to be cooled Tc and the ambient temperature Ts. q3 represents the amount of other flows of heat into the region to be cooled caused by electrical wiring to the radiation detecting element and the like and thermal conduction, Joule heat and the like of solids, which can be ignored because it is small.

q represents the amount of heat absorption that is left after the above-described flows of thermal energy q1, q2 and q3 are subtracted from the cooling capability Q, i.e., that is left for the cooling of the region to be cooled. Therefore, if q is positive (q>0), the region to be cooled is cooled. When q=0, the temperature of the region to be cooled becomes constant (thermal equilibrium). If q is negative (q<0), the temperature of the region to be cooled is increased.

Problems encountered in cooling will now be described with reference to drawings for clarity. A Ge detecting device for detecting γ-rays can not achieve sufficient performance unless cooled down to approximately 120 K or less. A Si(Li) detecting device for detecting X-rays also requires the same level of cooling temperature. FIG. 8 is a diagram simulating changes in the temperature (hereinafter referred to as "cooling curve") of the region to the cooled after the cooling is started. The vertical axis represents the temperature of the region to be cooled, and the horizontal axis represents elapsed time after the start of the cooling. Each curve represents a case in which there is a different degree of vacuum when the cooling is starting. When listed in the order of increasing degree of vacuum, curve H<curve I<curve J. The curve H draws a uniform curve and reaches thermal equilibrium at approximately 100 K to maintain a cooling temperature (hereinafter referred to as "maintenance of a cooling temperature"), whereas the curve I includes a region where its angle is decreased in the middle of cooling. The reason is that q is always sufficiently greater than 0 from the beginning of the cooling until the maintenance of a cooling temperature is started in the case of the curve H, whereas, in the case of the curve I, although q is sufficiently greater than 0 at the beginning of cooling, the angle has decreased in the middle of cooling as a result of increases in q1 and q2 that accompany an increase in the temperature difference between the temperature Tc of the region to be cooled and the ambient temperature Ts attributable to a poor degree of vacuum P{Gp(Tp), Ps, Gi(t)}. However, since q was slightly greater than 0, the physical absorbing material could be cooled although slowly and, as a result of an increase in the amount of absorption Gp(Tp) that accompanied the decrease in the temperature Tp of the physical absorbing material, the absorption could be performed even in high vacuum to complete the cooling. In the case of the curve J, since q was sufficiently greater than 0 at the beginning of cooling like the curve I, cooling proceeded to some extent, but q1 increased with the temperature difference between the temperature Tc of the region to be cooled and the ambient temperature Ts and, further, since the degree of vacuum P{Gp(Tp), Ps, Gi(t)} was poorer than the curve I, q1 is greater than the curve I, and the temperature Tp of the physical absorbing material could not be cooled any more and reached thermal equilibrium (q=0) in the middle of cooling.

The physical absorbing material has extremely high absorbing capability when cooled down to the vicinity of the temperature of liquid nitrogen (77 K). Specifically, if cooling is performed immediately after baking before deterioration of vacuum occurs to cool it down to the vicinity of the temperature of liquid nitrogen, the gases Gi(t) resulting from deterioration of vacuum thereafter can be sufficiently absorbed to keep on maintaining the cooling temperature for a long time. However, when it is cooled after being left uncooled for several months or more after baking, the temperature of the physical absorbing material reaches thermal equilibrium to become uncoolable before it reaches a cooling temperature at which it sufficiently absorbs the gases Gi(t) resulting from deterioration of vacuum as described above.

Conventional radiation detecting apparatuses that require cooling have exhibited cooling curves as represented by the curves I and J after a short period of time and have therefore exhibited poor reliability because they have been subjected to quick deterioration of vacuum and have used only a physical absorbing material.

It is an object of the present invention to improve a period allowing stable cooling which is an important factor related to the reliability of a radiation detecting apparatus that requires cooling, to reduce the influence of vibrations generated by bubbles, a refrigerator and the like and to improve energy resolution that is important performance in the measurement of radiation.

SUMMARY OF THE INVENTION

In order to achieve the above-described object, as a means for improving a period allowing stable cooling, in a radiation detecting apparatus according to the present invention, the surface roughness of major parts of a vacuum container is set at 0.1 $\mu$mRa or less; a seal made of metal is used for a vacuum seal portion; and a superinsulation is interposed between a region to be cooled and an inner wall of the vacuum container. Further, it is characterized in that a physical absorbing material and a chemical absorbing material are provided in the vacuum system to perform absorption evacuation.

Further, it is characterized in that it uses, as a means for reducing microphonic noises, a means that uses a vibration damping material having an integral structure including at least Mn and Cu for components forming a cryostat or uses the vibration damping material for components forming a cooling rod 8 or a radiation detecting element cup 19 in a radiation detector capsule.

First, a description will be made on an increase in the period allowing stable cooling achieved by decreasing q1 as a result of a decrease of G(t) in Equation 1.

According to the present invention, major parts in a vacuum container have low surface roughness. This results in a small surface area and a reduction in microcracks and scratches attributable to processing. As a result, the amount of gaseous molecules absorbed to the surface is reduced. Further, since the surface is smooth, gaseous molecules are more easily released during baking. For those reasons, out gas from the surface is reduced to decrease G(t). While the lowest possible surface roughness is desirable, it is preferably at least a mirror surface, i.e., at 0.1 $\mu$mRa or less in the sense of achieving a small thermal radiation coefficient $\epsilon i$.

Further, the use of a seal made of metal which requires no vacuum grease at a vacuum seal portion makes it possible to prevent deterioration of vacuum attributable to gases that pass through a conventional O-ring made of synthetic rubber and out gas from the vacuum grease, thereby reducing G(t).

Second, a description will be made on an increase in the period allowing stable cooling achieved by decreasing q2 in Equation 1. According to the present invention, a superinsulation is interposed between a region to be cooled and an inner wall of a vacuum container. A superinsulation is a film that blocks infrared from thermal radiation and preferably has a small infrared radiation coefficient on both sides thereof. Although one sheet is effective, an array of such films kept untouched by each other is more effective. In this case, the effect is reduced if temperature of one sheet is different from that of another adjacent thereto and those films are in thermal contact with each other. Taking this into consideration, a mesh of glass wool, polyester or the like was used as a spacer for preventing the contact. In order to achieve a sufficient effect of blocking thermal radiation, it is preferable to form several tens of layers of a combination of a film for blocking infrared and a spacer. The use of such a superinsulation makes it possible to reduce the entrance of heat as a result of thermal radiation and to thereby decrease q2.

Third, a description will be made on an increase of a period allowing stable cooling achieved by providing a physical absorbing material and a chemical absorbing material in the vacuum system to perform absorption evacuation. The types of chemical absorbing materials include those which cause heating and evaporation (hereinafter referred to as "evaporation type chemical absorbing materials"), those which cause no evaporation but heating (hereinafter referred to as "heating/no evaporation type chemical absorbing materials") and those which are used around the room temperature (hereinafter referred to as "non-evaporation type chemical absorbing materials"). A chemical absorbing material loses its absorbing capability when it is contaminated on its surface as a result of the absorption of gases. However, the absorbing capability of a chemical absorbing material can be recovered by heating it to disperse the contamination on the surface as a result of absorption into the interior. When an evaporation type chemical absorbing material is used, in order to prevent contamination of a radiation detecting element, electrical circuits, insulators and the like due to the evaporation, it is necessary to provide the chemical absorbing material in locations where the radiation detecting element and the like are not seen and to provide walls or the like between the radiation detecting element and the like and the chemical absorbing material. On the contrary, a heating/no evaporation type chemical absorbing material or a non-evaporation type chemical absorbing material does not contaminate the radiation detecting element and the like. Although a heating/no evaporation type chemical absorbing material or a non-evaporation type chemical absorbing material can always achieve a certain high absorbing speed if they are continually heated, infrared resulting from thermal radiation from the absorbing material can be absorbed by the region to be cooled to warm a cooling portion and can cause noises during the measurement of radiation. Further, thermal conduction by gases in vacuum can warm the cooling portion. Therefore, it is not preferable to always heat the chemical absorbing material. Similarly to the method to cope with the contamination of the detecting element and the like as a result of evaporation, it is possible to cope with this situation by providing the chemical absorbing material in locations where the radiation detecting element and the like are not seen and by providing walls or the like between the radiation detecting element and the like and the chemical absorbing material.

A description will now be made on the result of an examination on the effect of a chemical absorbing material provided on in a radiation detecting apparatus shown in FIG. 7 that utilizes a refrigerator. The size of a vacuum container of the apparatus is approximately 2 liters. The vacuum container includes a terminal for introducing a current from the outside into the container (hereinafter referred to as "current introducing terminal"). The operations in the vacuum container can be carried out by removing an end cap. The surface roughness of the inner wall of the end cap was reduced to 0.02 μmRa using electrolytic composite mirror finishing. Further, on the inner wall of the end cap, there was provided twenty layers of a combination of an infrared blocking film having a thickness of 9 μm obtained by depositing aluminum on both sides of a polyester film and a spacer constituted by a mesh made of polyester having a thickness of 200 μm. Thermal contact was established by a cooling rod having high thermal conductivity between the end of a cold finger and a radiation detecting element. Further, a physical absorbing material chamber is configured such that it is in thermal contact with the cooling rod. A temperature sensor for measuring a cooling temperature is provided on an outer wall of the physical absorbing material chamber.

A part made of a heating/no evaporation type absorbing material obtained by wrapping a compact heater which is energized for heating with approximately 1 g of chemical absorbing material mainly composed of Zr, V and Fe (hereinafter referred to as "heating/no evaporation type chemical absorbing part") has two electrical wires for energization protruding therefrom. The electrical wires are fixed by connecting it to two copper wires having a diameter of 0.8 mm which is connected to two current introducing terminals at the side of the vacuum and are provided in the vacuum container. Next, a chamber surrounding the part (hereinafter referred to as "chemical absorbing material chamber) was fabricated such that the heating/no evaporation type chemical absorbing part was not visible from the region to be cooled using a sheet made of glossy stainless steel having a thickness of 0.1 mm as its walls. Next, a physical absorbing material from which physically absorbed gases had been sufficiently removed by heating in vacuum was inserted in the physical absorbing material chamber. The end cap was installed on the main body, and baking was started.

A protective film is formed on the heating/no evaporation type chemical absorbing part before use to prevent the deterioration of the absorbing performance as a result of the absorption of the atmosphere. Therefore, this heating/no evaporation type chemical absorbing part was heated by energizing it for 5 minutes at approximately 600° C. after the baking was completed to remove this protective film (this process is hereinafter referred to as "activation").

First, FIG. 9 shows the results of evaluation of the degree of vacuum that allows stable cooling made by introducing dry nitrogen into the vacuum in the above-described state in order to stimulate the deterioration of vacuum and by performing cooling at various degrees of vacuum by driving the refrigerator. Curves O, P, Q and R show cases wherein cooling was started from $2\times10^{-2}$ Torr, $1\times10^{-1}$ Torr, $3\times10^{-1}$ Torr and 1 Torr, respectively. Referring to the curves O and P, the cooling is uniform, and a cooling temperature of approximately 100 K is maintained. Referring to the curve Q, the cooling proceeded down to 100 K and the cooling temperature was maintained, although its angle decreased in the middle of the cooling. Referring to the curve R, thermal equilibrium was reached in the middle of cooling, and the cooling could proceed only to approximately 230 K. That is, it is estimated that a degree of vacuum of approximately $1\times10^{-1}$ Torr or less is required to perform stable cooling with the detector having this configuration (such a degree of vacuum is hereinafter referred to as "limit degree of vacuum for cooling").

Next, FIG. 10 shows the results of measurement of changes in the degree of vacuum and cooling temperature caused on the curve R which allowed cooling down to only approximately 230 K made by reheating the heating/no evaporation type chemical absorbing part after the measurement for 10 minutes at approximately 600° C. (heating at approximately 500° C. or more after the activation to disperse contamination on the surface as a result of absorption by the chemical absorbing material into the interior, which is hereinafter referred to as "reactivation"). Referring to the degree of vacuum before the reactivation, absorption evacuation from 1 torr to $2\times10^{-1}$ Torr was achieved because the physical absorbing material had been cooled down to approximately 230 K. The reactivating in this vacuum resulted in an abrupt decrease of the degree of vacuum down to the level of $10^{-4}$ Torr. This improved vacuum thermal insulation to cause the cooling temperature to decrease down to approximately 100 K. referring to the degree of vacuum during the maintenance of the cooling temperature at this time, it is apparent that the physical absorbing material achieved absorption evacuation down to the level of $10^{-5}$ Torr.

Next, the deterioration of vacuum in the radiation detecting apparatus having the above-described configuration was measured for five days after replacing the physical absorbing material and heating/no evaporation type chemical absorbing part, performing activation at an early stage of baking, and completing the baking. FIG. 11 shows comparison of the deterioration of vacuum between the present invention and a conventional radiation detecting apparatus. It is apparent that the deterioration of vacuum is slower in the present invention. The degree of vacuum occurring ten years later can be estimated by extrapolating data on the deterioration of vacuum in five days. It is estimated that deterioration of vacuum of several Torr will occur even in the case of the present invention after ten years. It is further apparent that the limit degree of vacuum for cooling is reached in about one month.

FIG. 12 shows the result of measurement of changes in the degree of vacuum made by performing reactivation for five minutes at approximately 600° C. after the measurement for five days. The horizontal axis represents the time since the commencement of the reactivating, and the vertical axis represents the degree of vacuum. It is apparent that this reactivation causes absorption evacuation from the degree of vacuum of approximately $3\times10^{-2}$ Torr to approximately $1\times10^{-3}$ Torr and that this degree of vacuum is maintained for tens of thousands sec. Thereafter, the surface of the absorbing part was contaminated; the absorbing effect was substantially lost; and the normal speed of deterioration of vacuum was reestablished. This indicates that the effect of absorption evacuation that accompanies the reactivation of the heating/no evaporation type chemical absorbing part used this time lasts only for tens of thousands sec. It is thus apparent that a great number of chemical absorbing parts are required in order to maintain the vacuum of $10^{-4}$ Torr or less required for vacuum thermal insulation for several years with only the chemical absorbing material.

Next, FIG. 13 shows the results of measurement of changes in the degree of vacuum in the radiation detecting apparatus having the above-described configuration caused by setting the degree of vacuum at 7 Torr using dry nitrogen and by reactivating a new heating/no evaporation type chemical absorbing part. First, reactivation for five minutes at approximately 600° C. caused absorption evacuation from the degree of vacuum of 7 Torr to 2 Torr. Next, the reactivation for 15 minutes at approximately 600° C. caused absorption evacuation down to a degree of vacuum of approximately $3 \times 10^{-3}$ Torr which was lower than the limit degree of vacuum for cooling. A comparison this result to FIG. 11 showing the result of the measurement of the above-described deterioration of vacuum gives an estimation that the use of the new heating/no evaporation type chemical absorbing part allows stable cooling for about ten years.

As a result of a cooling test after this measurement, a uniform cooling curve was drawn and cooling proceeded down to approximately 100 K because absorption evacuation was carried out down to a degree of vacuum lower than the limit degree of vacuum for cooling.

The chemical absorbing material can perform absorption evacuation by being heated when evacuation if required. For example, stable cooling can be achieved by establishing a degree of vacuum lower than the limit degree of vacuum for cooling before cooling or at an early stage of cooling. It is therefore desirable to provide a means for automatically heating the chemical absorbing material to perform evacuation down to a degree of vacuum lower than the limit degree of vacuum for cooling before cooling or at an early stage of cooling. In doing so, absorption evacuation may be carried out by using a means for heating the chemical absorbing material for a predetermined period during which sufficient absorbing evacuation can be achieved or by using a means for measuring the degree of vacuum in the vacuum container and a means for automatically heating the chemical absorbing material from the measured value of the degree of vacuum in the vacuum container to heat the chemical absorbing material until a degree of vacuum lower than the limit degree of vacuum for cooling is achieved to perform absorption evacuation. Alternatively, a means for manually heating the chemical absorbing material and a means for displaying a measured value of the degree of vacuum in a vacant container may be used to perform absorption evacuation by heating the chemical absorbing material until a degree of vacuum lower than the limit degree of vacuum for cooling is achieved and, further alternatively, the chemical absorbing material may be manually heated for a predetermined period.

For example, when it is revealed that poor vacuum reduces the cooling speed or disallows cooling down to a target temperature of cooling during cooling from the room temperature, it is possible to use a means for displaying a measured value of the temperature of the radiation detecting element or a measured value of the degree of vacuum in the vacuum container and a means for manually heating the chemical absorbing material to heat the chemical absorbing material and to thereby perform absorption evacuation until the normal cooling speed is reached and, alternatively, a means for automatically heating the chemical absorbing material may be used to perform absorption evacuation.

For example, when it is revealed that deterioration of vacuum during the maintenance of the cooling temperature has resulted in a temperature rise of the radiation detecting element, it is possible to use a means for displaying a measured value of the temperature of the radiation detecting element or a measured value of the degree of vacuum in the vacuum container and a means for manually heating the chemical absorbing material to heat the chemical absorbing material and to thereby perform absorption evacuation until the cooling temperature is maintained normally and, alternatively, a means for automatically heating the chemical absorbing material may be used to perform absorption evacuation.

Fourth, by using the vibration damping material at portions where vibrations that cause microphonic noises propagate to damp the propagation of the vibrations to the detecting detector, microphonic noises are reduced and the deterioration of the energy resolution of the detector can be reduced.

DETAILED DESCRIPTION

Figure 1:
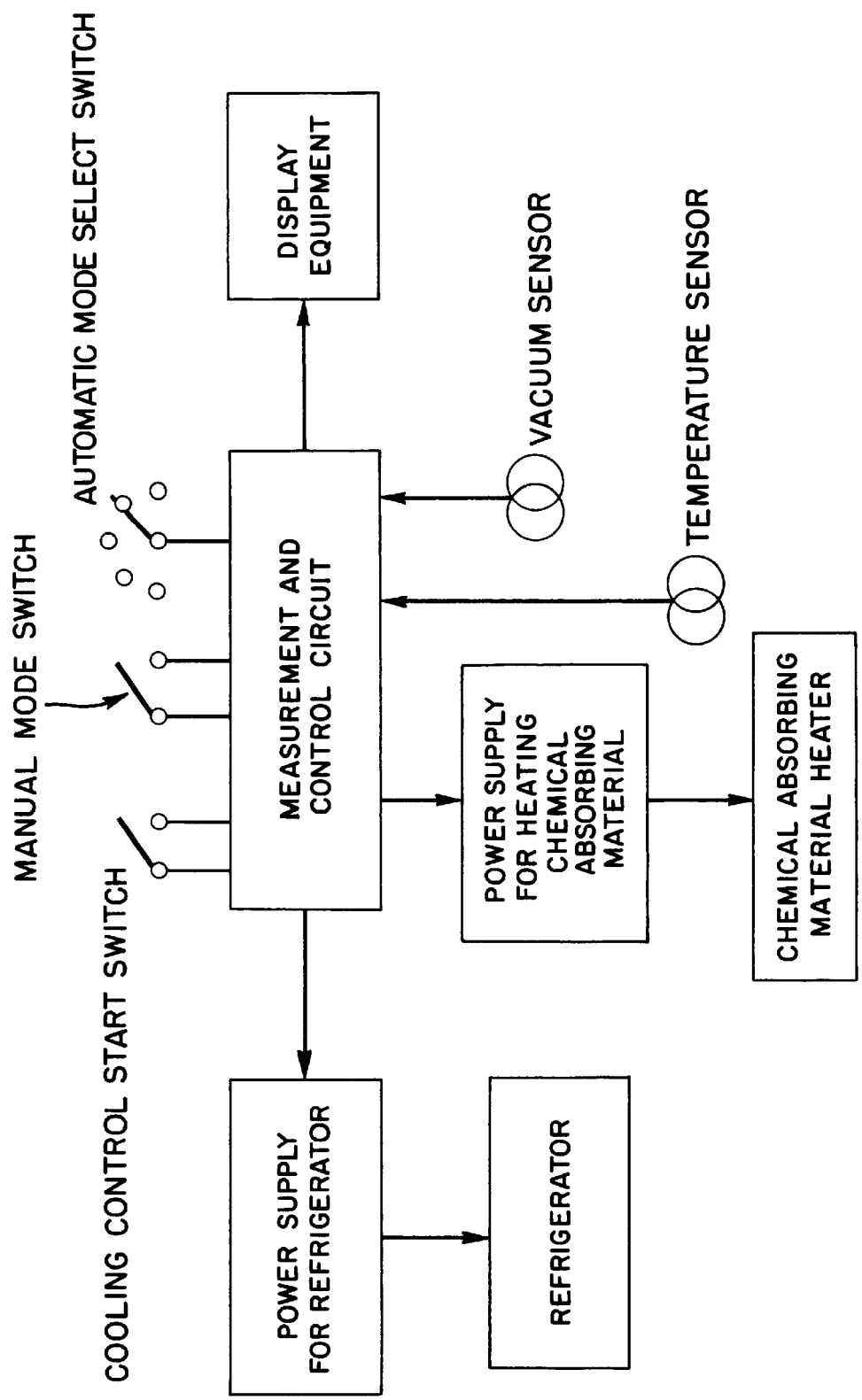
FIG. 1 is a diagram showing electrical connections of a radiation detecting apparatus according to the present invention.
Figure 2:
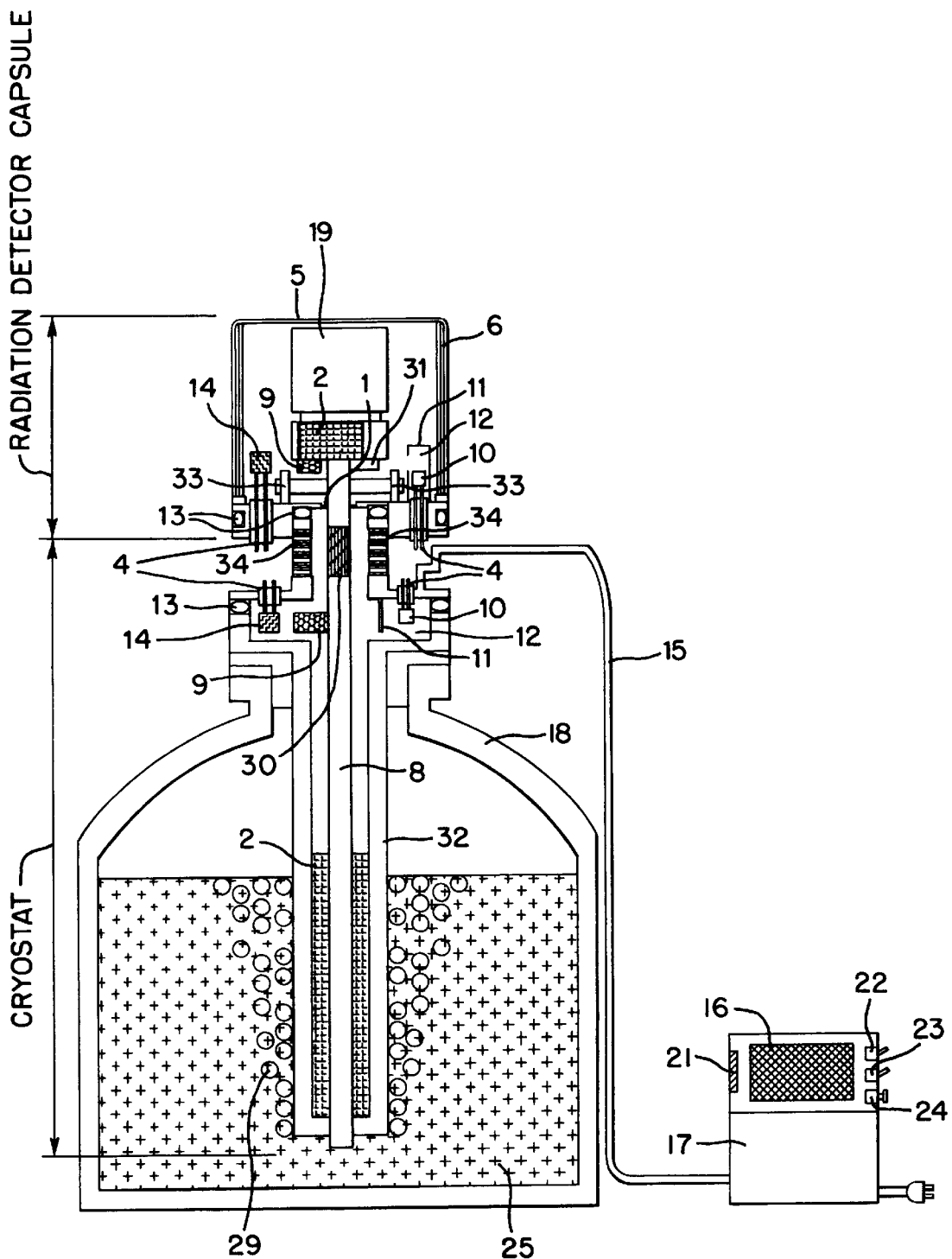
FIG. 2 shows a radiation detecting apparatus cooled using liquid nitrogen according to the present invention.
Figure 3:
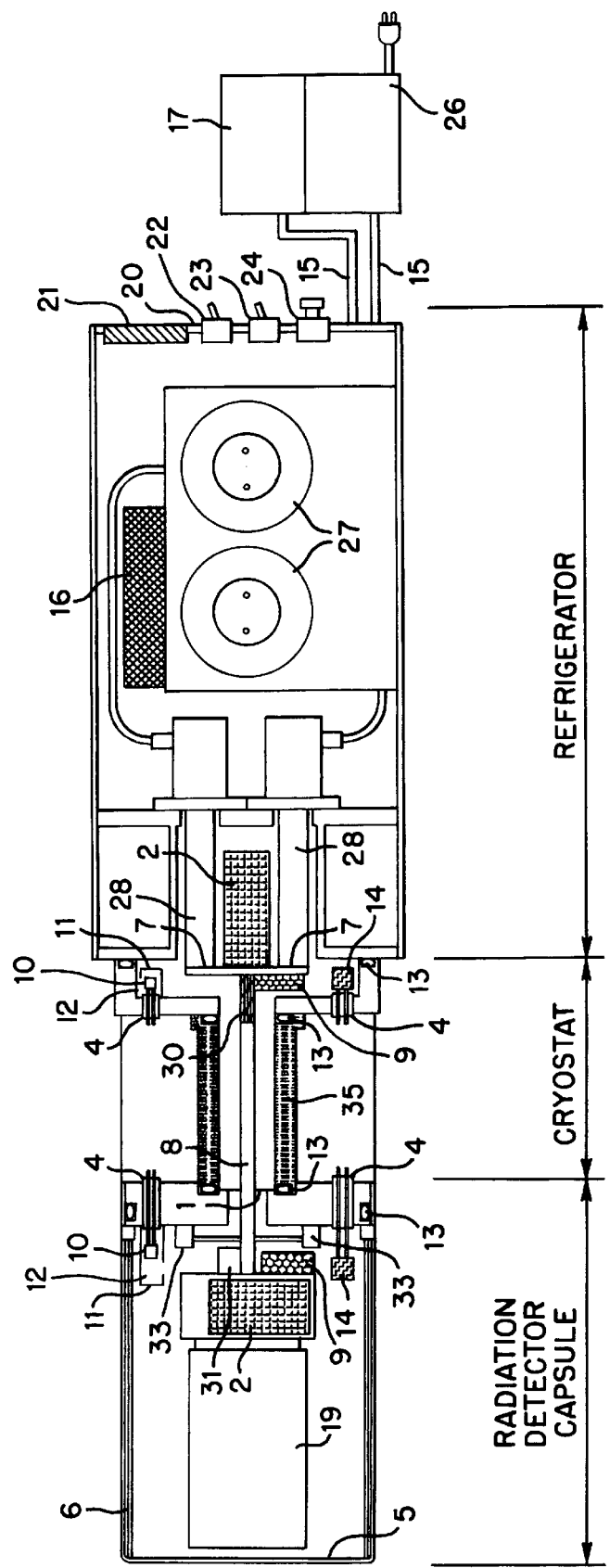
FIG. 3 shows a radiation detecting apparatus according to the present invention which uses a refrigerator and in which vacuum in a cryostat and a radiation detector capsule is separated by a septum.
Figure 4:
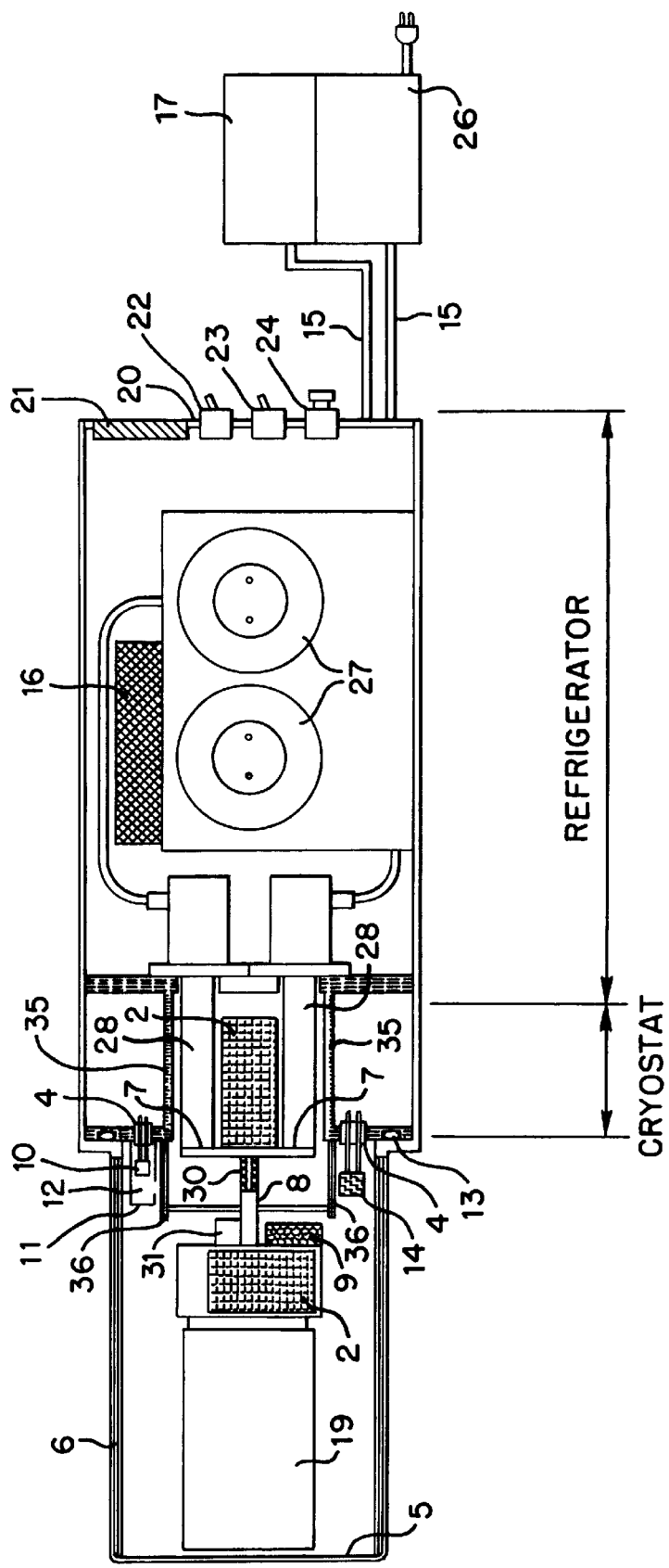
FIG. 4 shows a radiation detecting apparatus according to the present invention which uses a refrigerator and in which vacuum in a cryostat and a radiation detector capsule is not separated by a septum.
Figure 5:
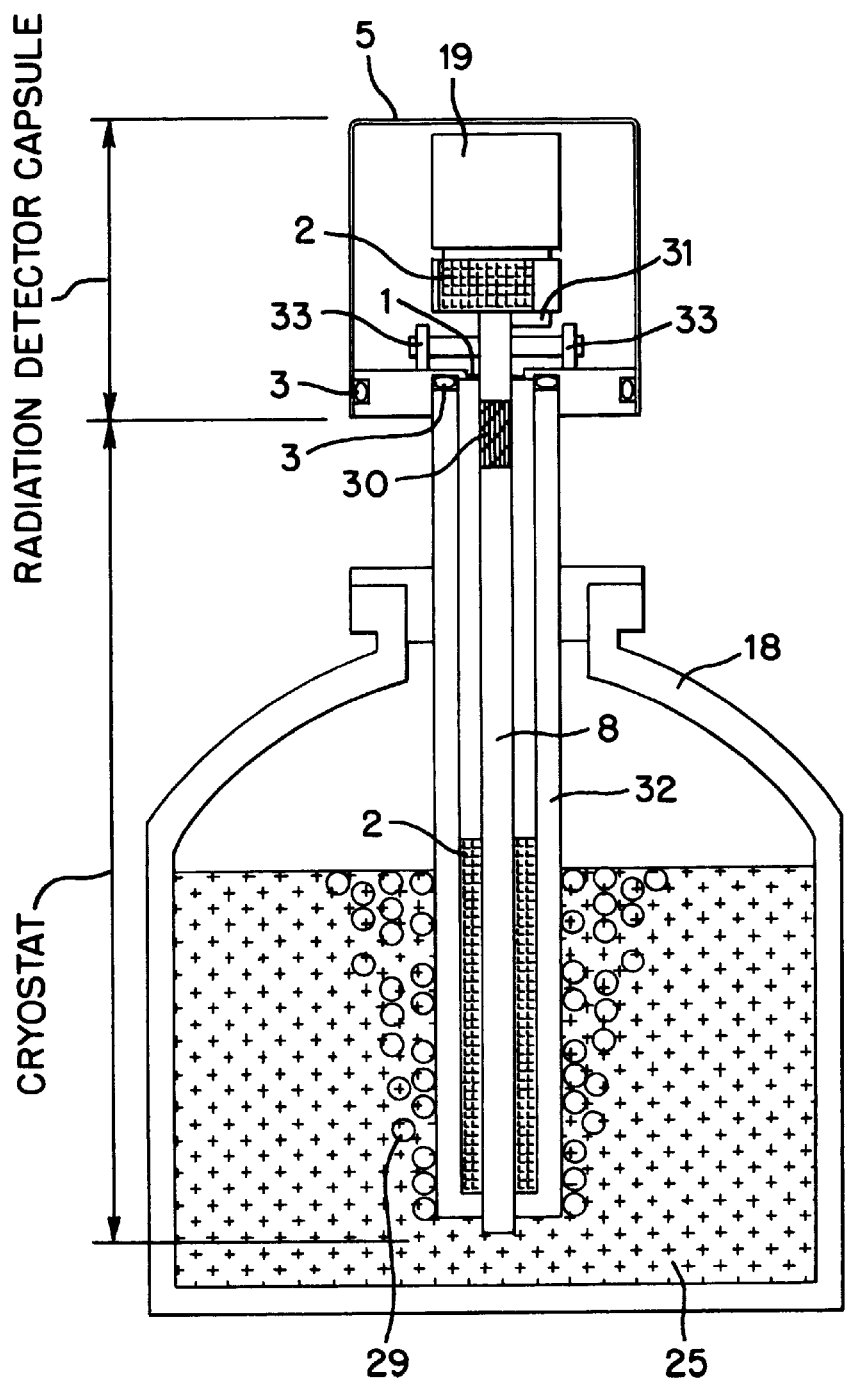
FIG. 5 shows a conventional radiation detecting apparatus cooled using liquid nitrogen.
Figure 6:
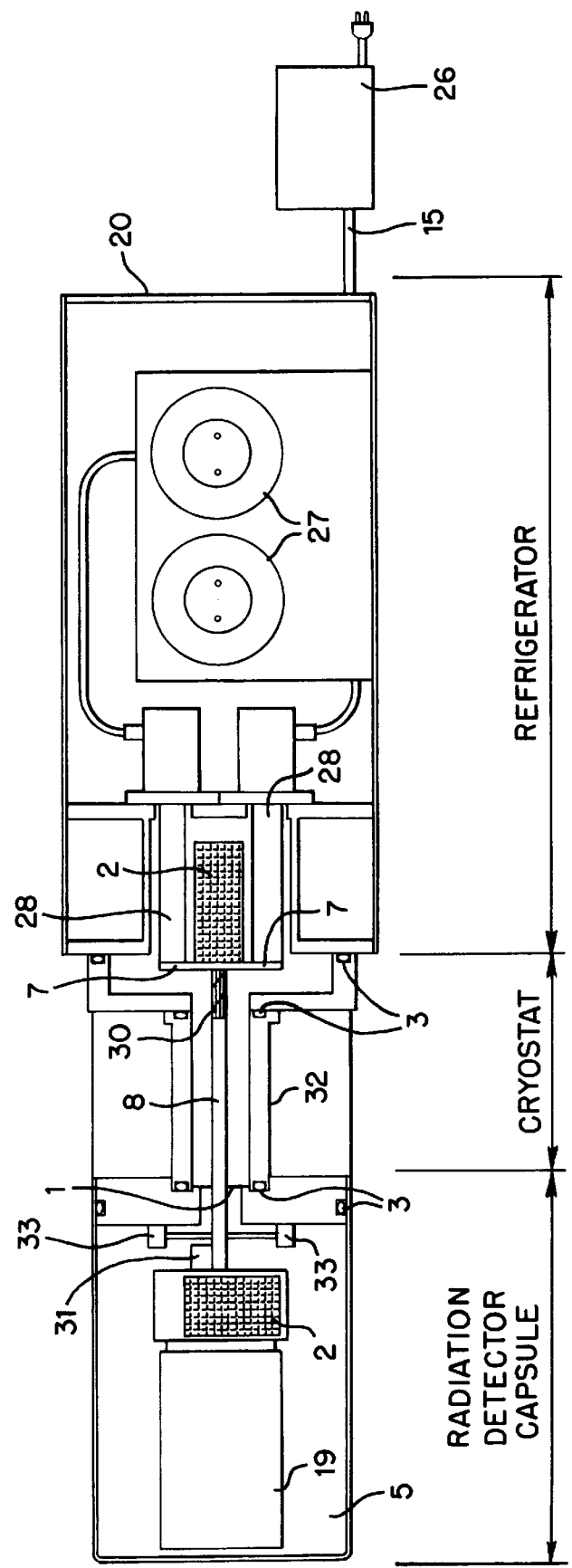
FIG. 6 shows a conventional radiation detecting apparatus which uses a refrigerator and in which vacuum in a cryostat and a radiation detector capsule is separated by a septum.
Figure 7:
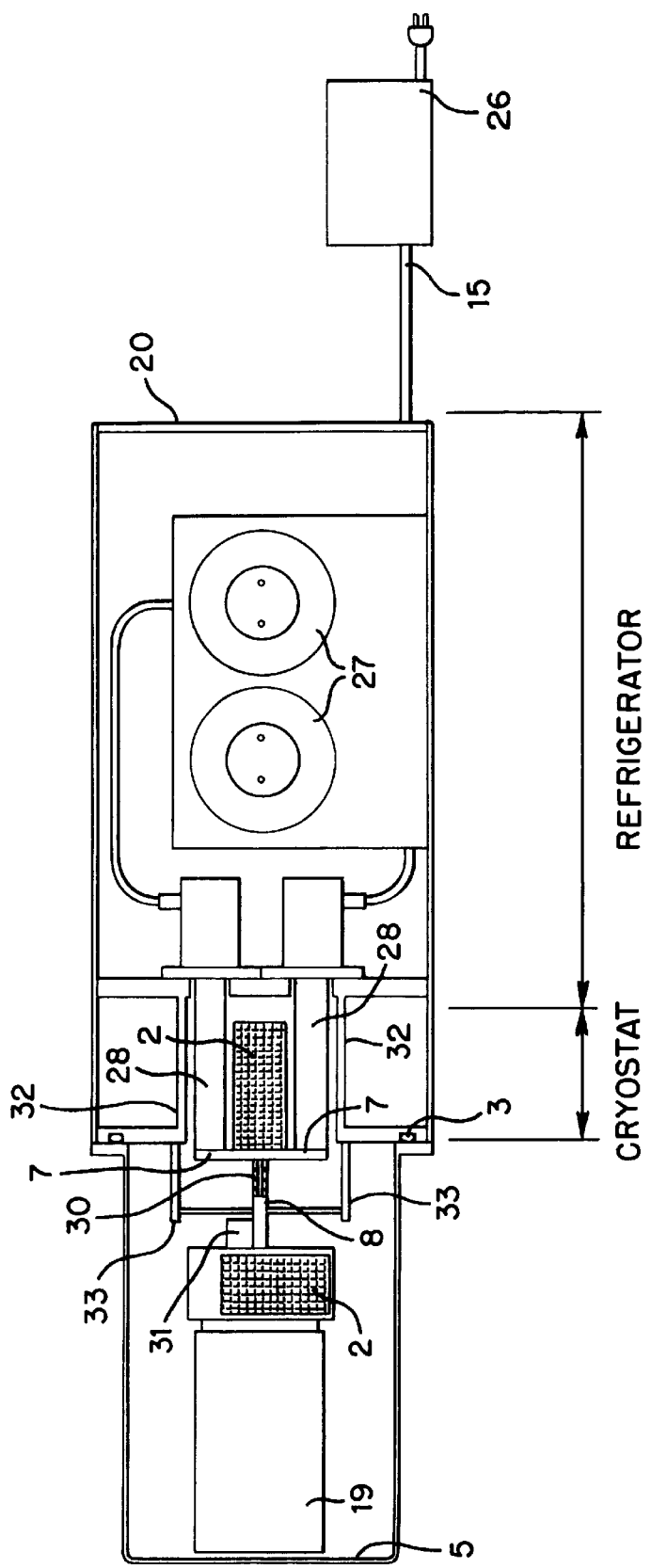
FIG. 7 shows a conventional radiation detecting apparatus which uses a refrigerator and in which vacuum in a cryostat and a radiation detector capsule is not separated by a septum.
Figure 8:
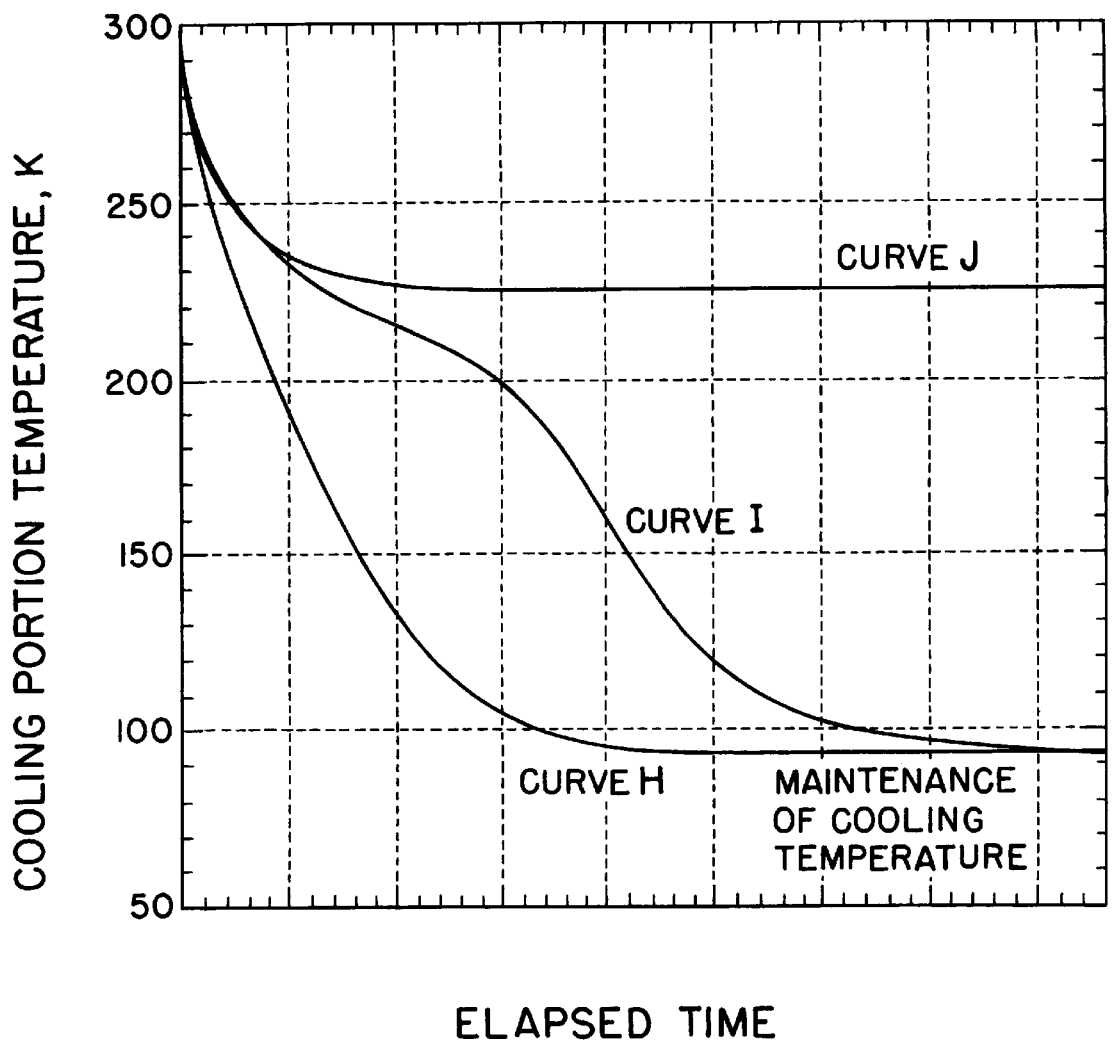
FIG. 8 is a diagram simulating cooling curves of cooling from different degrees of vacuum to clarify problems in the prior art.
Figure 9:
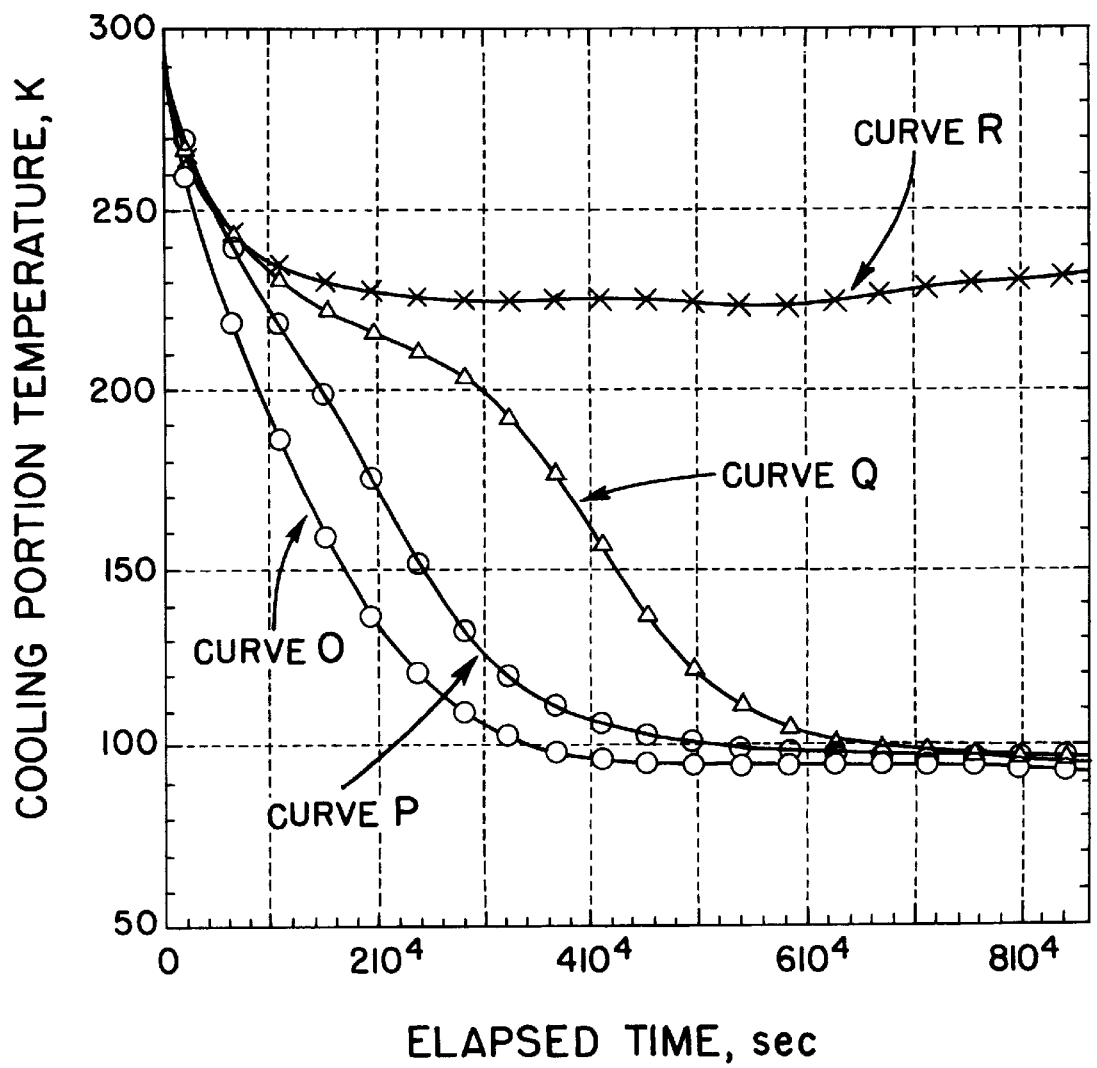
FIG. 9 is a diagram of cooling from different degrees of vacuum that simulates the deterioration of vacuum to clarify the operation of the present invention.
Figure 10:
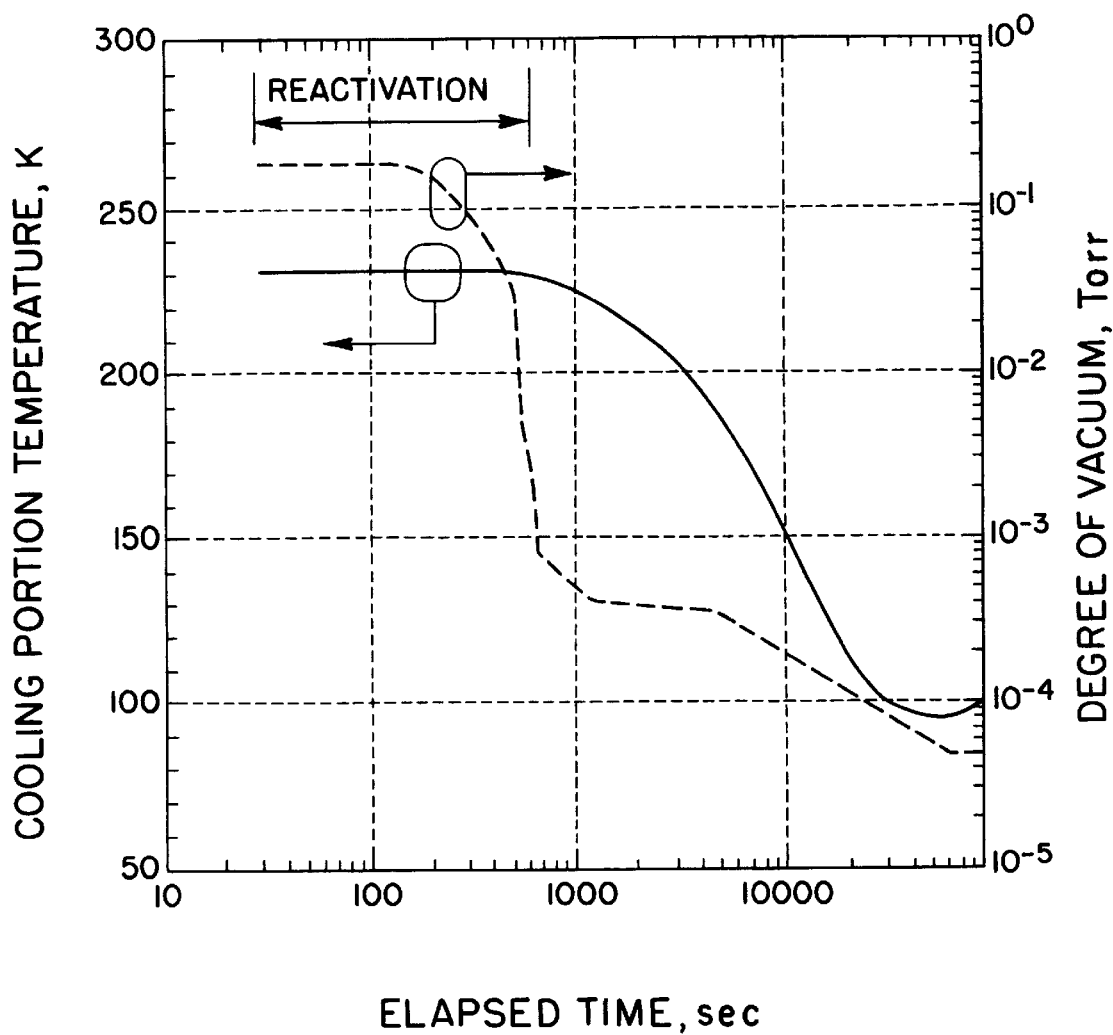
FIG. 10 is a diagram showing a example wherein cooling proceeds as a result of an action of a chemical absorbing material form thermal equilibrium reached in the middle of cooling until a cooling temperature is maintained to clarify the operation of the present invention.
Figure 11:
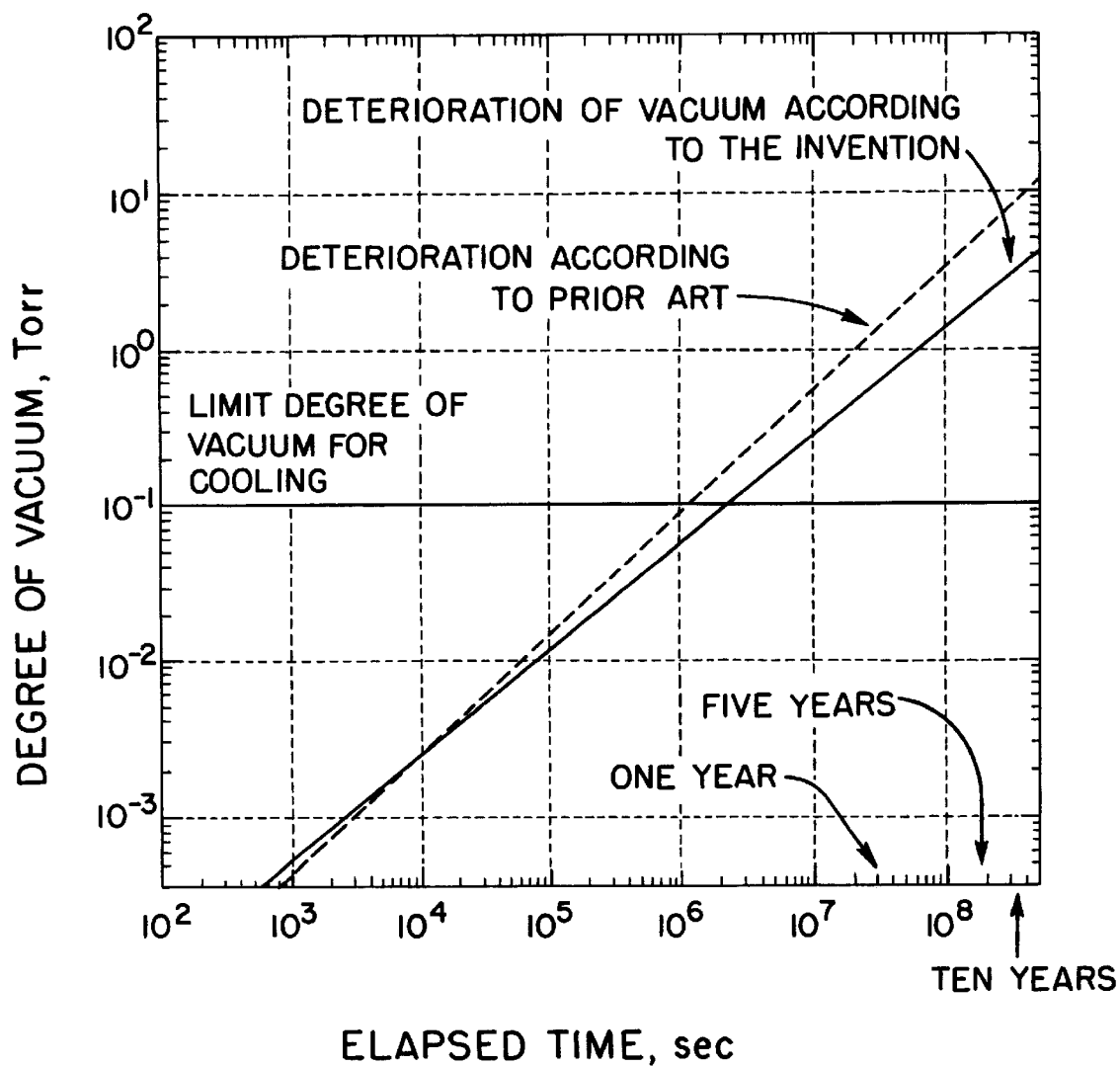
FIG. 11 is a diagram which compares the deterioration of vacuum according to the present invention and the deterioration of vacuum in the prior art to clarify the operation of the present invention.
Figure 12:
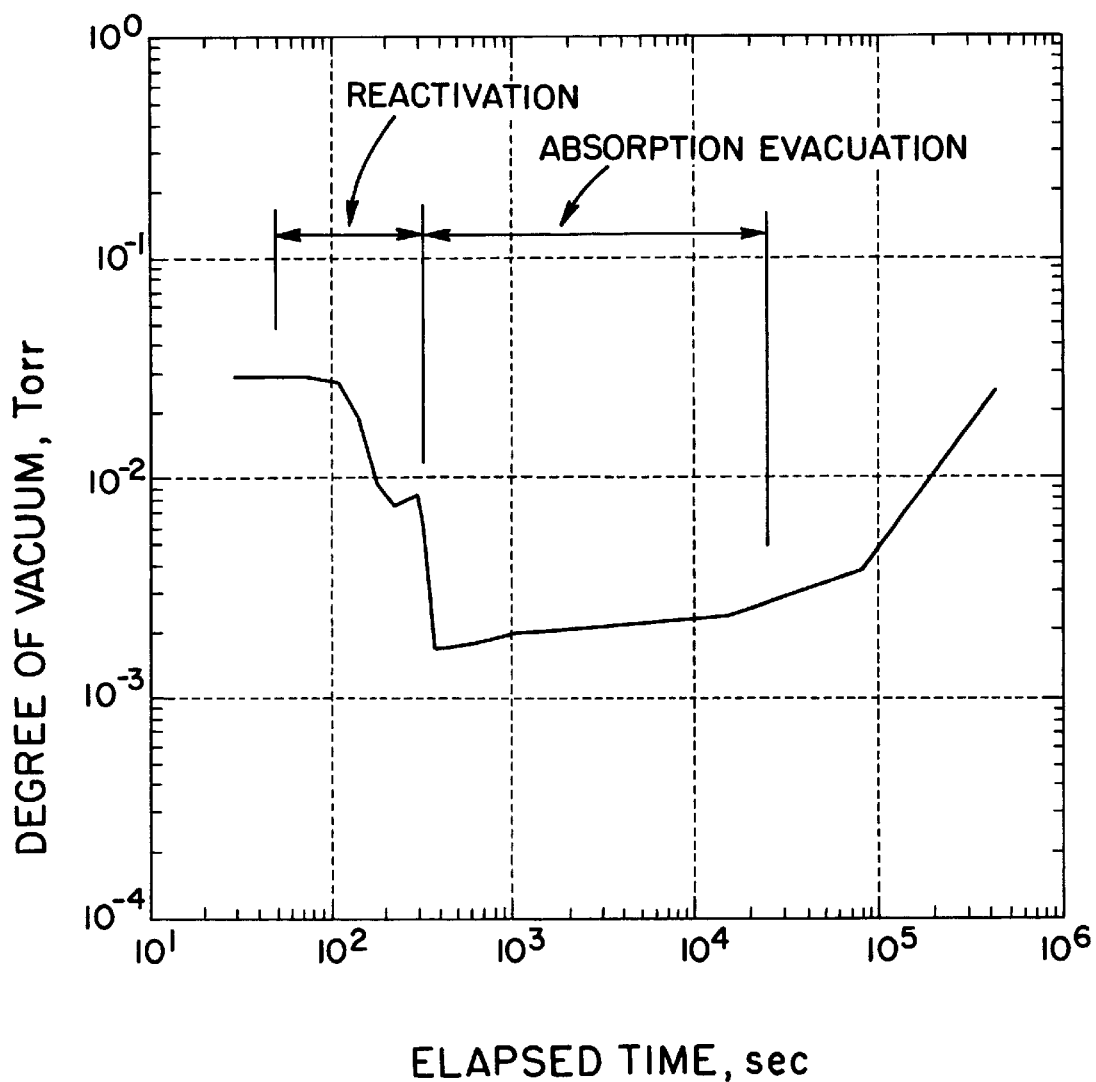
FIG. 12 is a diagram showing the degree of vacuum after reactivating and time of an absorbing action to clarify the operation of the present invention.
Figure 13:
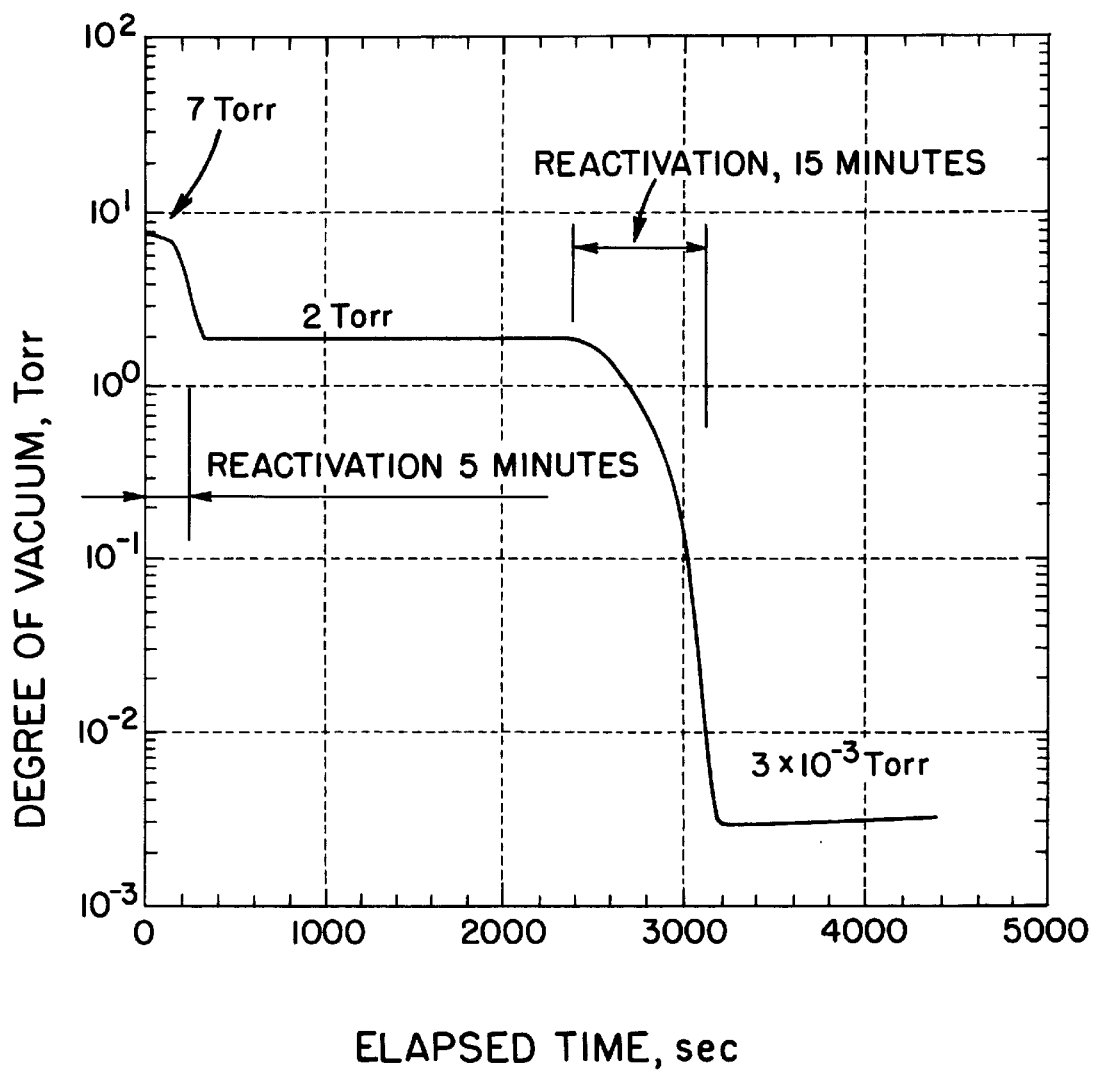
FIG. 13 is a diagram showing absorption evacuation to a limit degree of vacuum for cooling which is achieved by reactivating after simulating vacuum of about ten years later to clarify the operation of the present invention.
Figure 14:
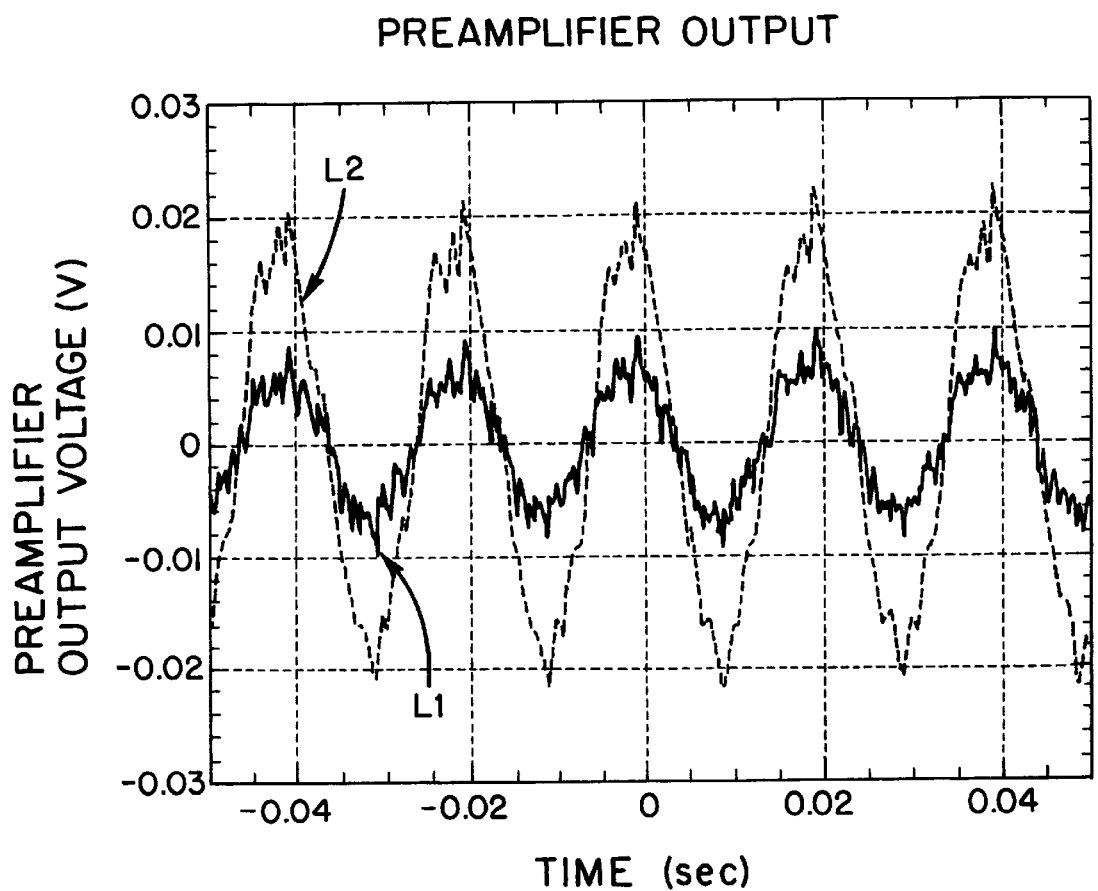
FIG. 14 is a diagram wherein a method for reducing microphonic noises according to the present invention is compared to the prior art in terms of a preamplifier output of a radiation detecting apparatus according to the present invention.

An embodiment of the present invention will now be described based on the drawings. The description will be first focused on the improvement of the period that allows stable cooling. FIG. 1 shows electrical connections in an radiation detecting apparatus according to the present invention. A temperature sensor and a vacuum sensor are connected to a measurement and control circuit, and measured values therefrom can be displayed on display equipment. Two or more of each of those sensors may be connected. When a manual mode switch is turned on, a power supply for heating a chemical absorbing material operates to cause a chemical absorbing material heater to heat the chemical absorbing material, thereby allowing absorption evacuation. A plurality of automatic modes can be selected with an automatic mode select switch. In each automatic mode, the power supply for heating the chemical absorbing material and a refrigerator can be operated under a program stored in the control circuit in advance. For example, it is possible to store an instruction that causes the power supply for heating the heating absorbing material to operate until the vacuum sensor indicates a set degree of vacuum before or at the same time as a compressor in the refrigerator is driven or an instruction that causes the power supply for heating the heating absorbing material to operate for a set period to perform an operation in the set automatic mode. When liquid nitrogen is used for cooling, there is neither power supply for a refrigerator nor a refrigerator. When the heating/no evaporation type chemical absorbing part is used as the chemical absorbing material, the chemical absorbing material heater is a heater that utilizes energization and, when heating is carried out using induction heating, a laser and the like, an apparatus therefor serves as the chemical absorbing material heater. The embodiment described below is an example wherein the heating/no evaporations type chemical absorbing part is used as the chemical absorbing material. FIG. 2 is a radiation detecting apparatus according to the present invention wherein liquid nitrogen 25 is used for cooling. Vacuum in a cryostat and a radiation detector capsule is separated by a septum 1 such that each of them can be easily removed. The surface roughness of the inner wall of an end cap 5 is reduced to 0.02 $\mu$mRa through electrolytic composite mirror finishing. On this inner wall, there was provided twenty layers of superinsulation 6 constituted by a combination of an infrared blocking film having a thickness of 9 $\mu$m obtained by depositing aluminum on both sides of a polyester film and a spacer constituted by a mesh made of polyester having a thickness of 200 $\mu$m. A hollow metal O-ring 12 made of Al was used as the O-ring. Since the vacuum is separated by the septum 1, a chemical absorbing material chamber 12 partitioned by a wall 11 made of stainless steel, a heating/no evaporation type chemical absorbing part 10, a vacuum sensor 14, and a temperature sensor 9 are provided in each of the vacuum containers. Wiring for signals from each sensor, for supplying power to the heating/no evaporation type chemical absorbing part 10 and for other purposes is led out at a current introducing terminal 4 and is connected by and electrical cord 15 to a measurement and control circuit 16 and a power supply 17 for the chemical absorbing material. After connecting the radiation detector capsule and the cryostat, the interior of each vacuum container was evacuated from a vacuum port and was baked. Next, the cryostat is inserted into a dewer to cool a cooling rod 8 in the cryostat, a physical absorbing material in a physical absorbing material chamber 2 which is in thermal contact with the cooling road in the radiation detector capsule, and a radiation detecting element in a radiation detecting element cup 19. By setting a cooling control start switch when this cooling is started, the heating/no evaporation type chemical absorbing part can be heated as needed as described above. FIG. 3 shows a case wherein a refrigerator is used and wherein the vacuum in the cryostat and the radiation detector capsule is separated by the septum 1. Each of the vacuum container is equipped with a port for evacuation. The chemical absorbing material chamber 12 partitioned by the wall 11, heating/no evaporation type chemical absorbing part 10, vacuum sensor 14, and temperature sensor 9 are provided in each of the vacuum containers shown in FIG. 3. Display equipment 21, a cooling control start switch 22, a manual mode switch 23 and an automatic mode select switch 24 are provided on a rear panel 20. By setting the cooling control start switch 22, the refrigerator can be driven to heat the heating/no evaporation type chemical absorbing part 10 when necessary. When the refrigerator is driven, an end 7 of a cold finger is cooled and, then, the cooling rod 8, physical absorbing material and radiation detecting element are cooled. FIG. 4 shows a case wherein a refrigerator is used and wherein the vacuum in the cryostat and the radiation detecting element is not separated by a septum. Therefore, one each of the chemical absorbing material chamber 12, heating/no evaporation type chemical absorbing part 10, vacuum sensor 14, and temperature sensor 9 are provided.

Next, the description will be focused on the reduction of microphonic noises.

Figure 15:
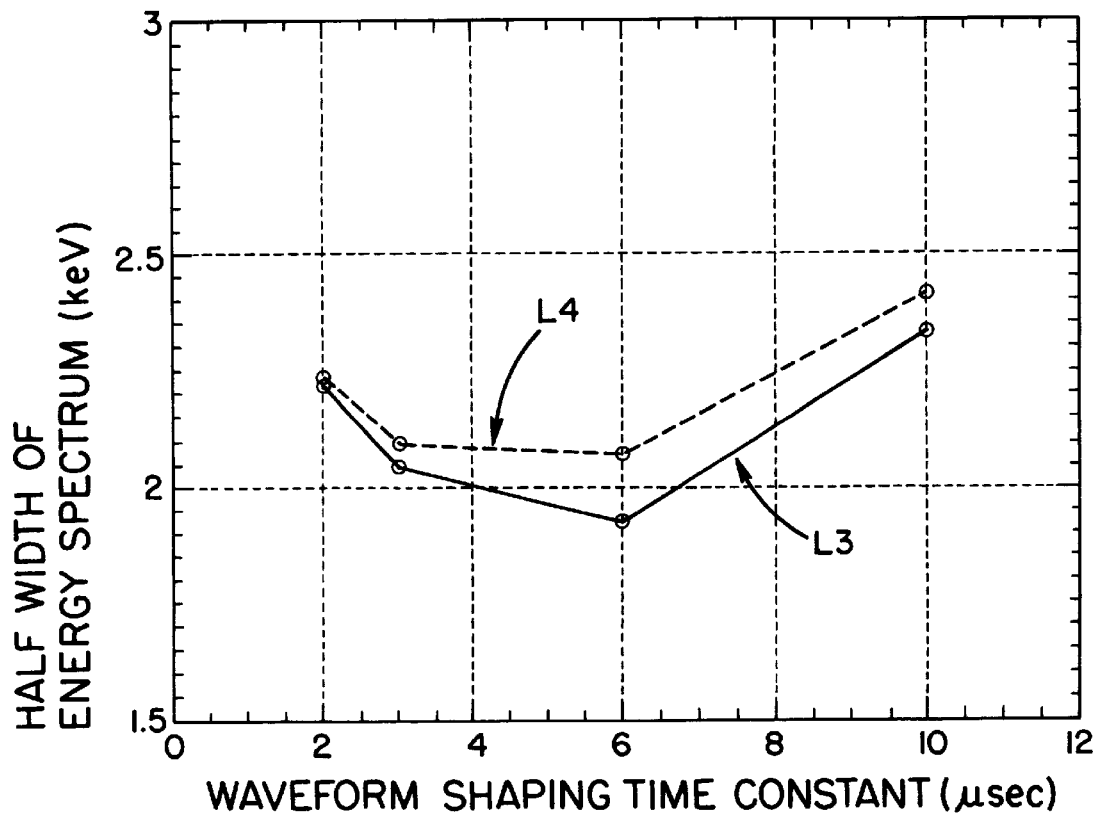
FIG. 15 is a diagram wherein a method for reducing microphonic noises according to the present invention is compared to the prior art in terms of energy resolution of a radiation detecting apparatus according to the present invention.

In the radiation detecting apparatus utilizing a refrigerator shown in FIG. 3, vibrations generated by a compressor 27 and the like were damped by a cryostat outer pipe 35 utilizing a vibration damping material to reduce microphonic noises. FIG. 4 shows preamplifier output signals obtained in a case wherein the cryostat outer pipe is made of a conventionally used aluminum alloy and in a case wherein it utilizes a vibration damping material according to the present invention. It is apparent that since a stirling refrigerator is driven at 10 Hz, an output signal of the preamplifier includes microphonic noises at 50 Hz attributable to vibrations thereof. It is apparent that while there is microphonic noises at approximately ±0.02 V in the case L2 wherein the aluminum alloy is used, the microphonic noises are halved to approximately ±0.01 V in the case L1 wherein the vibration damping material is used. FIG. 15 is an example showing energy resolutions in a case L4 wherein the aluminum alloy was used and a case L3 wherein the vibration damping material according to the invention was used. Co-60 was used as the source of radiation, and energy resolution for a $\gamma$-ray of 1.33 MeV was evaluated. The result was 2.1 keV when the aluminum alloy was used and was 1.9 keV when the vibration damping material was used at a waveform shaping time constant of 6 $\mu$sec., which indicated an improvement of about 10%. It is obvious that the energy resolution was improved when the vibration damping material according to the invention was used compared to the prior art.

FIG. 4 shows a case wherein the vibration damping material was used for a support rod 36 and the cryostat outer pipe 35. Vibrations propagated from the compressor 27 are damped by the cryostat and the support rod 36 that utilizes the vibration damping material. The energy resolution was improved compared to that in a case wherein the support rod was made of stainless steel as in the prior art.

FIG. 2 shows a case wherein a vibration damping material 34 was used for a cryostat outer pipe 32 cooled by liquid nitrogen. Vibration caused by nitrogen bubbles 29 are damped by the vibration damping material 34 utilizing a vibration damping material. The energy resolution was improved compared to that in a case wherein it was made of stainless steel as in the prior art.

As described above, the surface roughness of major parts in a vacuum container of a radiation detecting apparatus is set at 0.1 μmRa or less; a seal made of metal is used for a vacuum seal portion to slow the deterioration of vacuum; a superinsulation is interposed between a region to be cooled and an inner wall of a vacuum container to prevent heat from flowing in as a result of thermal radiation; and a physical absorbing material and a chemical absorbing material are provided in the vacuum system. The chemical absorbing material is operated as needed to improve a period that allows stable cooling.

Further, a vibration damping material prevents vibrations caused by the generation of nitrogen bubbles, driving of a refrigerator and the like from propagating to a radiation detector to reduce the deterioration of energy resolution due to microphonic noises, thereby improving the accuracy of qualitative and quantitative analysis in facilities related to nuclear reactors, facilities related to accelerators, medical equipment utilizing radiation, analysis equipment, nuclear physics, astrophysics, industrial instrumentation and the like. Although the means for reducing microphonic noises has been described with reference to a semiconductor radiation detecting apparatus, it may be used in other radiation detectors. For example, applicable radiation detectors include proportional counter tubes, ionization chambers, Geiger-Muller counter tubes, scintillation detectors and the like. In addition, it may be used for detecting for detecting other than radiation, and may be used for infrared detecting elements and the like. Furthermore, it may be used for other instrumentation equipment and acoustic equipment.

What is claimed is:

1. A radiation detecting apparatus for detecting radiation, comprising:
   a container having a vacuum space;
   a radiation detecting element disposed in the vacuum space for detecting radiation;
   a cooling element disposed in the container for cooling the radiation detecting element to a preselected cooling temperature during operation of the radiation detecting apparatus;
   a physical absorbing material disposed in the container for absorbing gases from the vacuum space;
   a chemical absorbing material disposed in the container and capable of activation by heat for absorbing gases from the vacuum space;
   heating means for heating the chemical absorbing material; and
   measuring means for measuring a temperature of the radiation detecting element to determine whether or not the chemical absorbing material should be activated by the heating means.

2. A radiation detecting apparatus as claimed in claim 1; wherein the heating means includes control means for manual operation by an operator to activate the heating means to heat the chemical absorbing material in accordance with a measurement by the measuring means.

3. A radiation detecting apparatus as claimed in claim 1; wherein the heating means includes means for automatically heating the chemical absorbing material in accordance with a measurement by the measuring means.

4. A radiation detecting apparatus as claimed in claim 1; wherein the heating means includes control means for manual operation by an operator to activate the heating means to heat the chemical absorbing material when a temperature of the radiation detection element measured by the measuring means is greater than the preselected cooling temperature.

5. A radiation detecting apparatus as claimed in claim 1; wherein the heating means includes means for automatically heating the chemical absorbing material when a temperature of the radiation detection element measured by the measuring means is greater than the preselected cooling temperature.

6. A radiation detecting apparatus for detecting radiation, comprising:
   a container having a vacuum space;
   a radiation detecting element disposed in the vacuum space for detecting radiation;
   a cooling element disposed in the container for cooling the radiation detecting element during operation of the radiation detecting apparatus;
   a physical absorbing material disposed in the container for absorbing gases from the vacuum space;
   a chemical absorbing material disposed in the container and capable of activation by heat for absorbing gases from the vacuum space;
   heating manes for heating the chemical absorbing material; and
   measuring means for measuring a degree of vacuum of the vacuum space to determine whether or not the chemical absorbing material should be activated by the heating means.

7. A radiation detecting apparatus as claimed in claim 6; wherein the heating means includes control means for manual operation by an operator to activate the heating means to heat the chemical absorbing material in accordance with a measurement by the measuring means.

8. A radiation detecting apparatus as claimed in claim 6; wherein the heating means includes means for automatically heating the chemical absorbing material in accordance with a measurement by the measuring means.

9. A radiation detecting apparatus for detecting radiation, comprising:
   a container having a vacuum space;
   a radiation detecting element disposed in the vacuum space for detecting radiation;
   cooling means for cooling the radiation detecting element during operation of the radiation detecting apparatus;
   a physical absorbing material disposed in the container and capable of activation by heat for absorbing gases from the vacuum space;
   heating means for heating the chemical absorbing material; and
   control means for controlling the heating means to heat the chemical absorbing material before cooling of the radiation detecting element by the cooling means.

10. A radiation detecting apparatus for detecting radiation, comprising:
   a container having a vacuum space;
   a radiation detecting element disposed in the vacuum space for detecting radiation;
   a cooling element disposed in the container for cooling the radiation detecting element during operation of the radiation detecting apparatus;
   a physical absorbing material disposed in the container for absorbing gases from the vacuum space;
   a chemical absorbing material disposed in the container and capable of activation by heat and absorbing gases from the vacuum space;

heating means for heating the chemical absorbing material; and control means for controlling the heating means to heat the chemical absorbing material when the cooling element begins to cool the radiation detecting element.

11. A radiation detecting apparatus for detecting radiation, comprising:

a container having a vacuum space;

a radiation detecting element disposed in the vacuum space for detecting radiation;

cooling means for cooling the radiation detecting element to a preselected cooling temperature during operation of the radiation detecting apparatus;

absorbing means capable of activation by heat for absorbing gases from the vacuum space;

heating means for heating the absorbing means; and control means for measuring a temperature of the radiation detecting element and for activating the heating means to heat the absorbing means when the measured temperature is greater than the preselected cooling temperature.

12. A radiation detecting apparatus as claimed in claim 11; wherein the control means includes means for manually activating the heating means to heat the absorbing means when the measured temperature is greater than the preselected cooling temperature.

13. A radiation detecting apparatus as claimed in claim 11; wherein the control means includes means for automatically activating the heating means to heat the absorbing means when the measured temperature is greater than the preselected cooling temperature.

14. A radiation detecting apparatus as claimed in claim 11; wherein the absorbing means comprises a chemically active getter for getting gases from the vacuum space.

15. A radiation detecting apparatus as claimed in claim 11; further comprising a physical absorbing material disposed in the container for absorbing gases from the vacuum space.

16. A radiation detecting apparatus for detecting radiation, comprising:

a container having a vacuum space;

a radiation detecting element disposed in the vacuum space for detecting radiation;

cooling means for cooling the radiation detecting element to a preselected cooling temperature during operation of the radiation detecting apparatus;

absorbing means capable of activation by heat for absorbing gases from the vacuum space;

heating means for heating the absorbing means; and control means for measuring a degree of vacuum of the vacuum space and for activating the heating means to heat the absorbing means when the measured degree of vacuum is below a preselected value.

17. A radiation detecting apparatus as claimed in claim 16; wherein the control means includes means for manually activating the heating means to heat the absorbing means when the measured degree of vacuum is below the preselected value.

18. A radiation detecting apparatus as claimed in claim 16; wherein the cooling means includes means for automatically activating the heating means to heat the absorbing means when the measured degree of vacuum is greater than the preselected value.

19. A radiation detecting apparatus as claimed in claim 16; wherein the absorbing means comprises a chemically active greater for getting gases from the vacuum space.

20. A radiation detecting apparatus as claimed in claim 16; further comprising a physical absorbing material disposed in the container for absorbing gases from the vacuum space.

* * * * *